(12) United States Patent
Bersch

(10) Patent No.: US 7,698,904 B2
(45) Date of Patent: Apr. 20, 2010

(54) CONTROL DEVICE FOR REFRIGERATION OR AIR CONDITIONING SYSTEMS

(75) Inventor: Hans-Jürgen Bersch, Simmerath (DE)

(73) Assignee: Emerson Electric GmbH & Co. OHG, Waiblingen (DE)

( * ) Notice: Subject to any disclaimer, the term of this patent is extended or adjusted under 35 U.S.C. 154(b) by 430 days.

(21) Appl. No.: 11/569,156

(22) PCT Filed: Apr. 20, 2005

(86) PCT No.: PCT/EP2005/004239

§ 371 (c)(1),
(2), (4) Date: Jul. 13, 2007

(87) PCT Pub. No.: WO2005/116541

PCT Pub. Date: Dec. 8, 2005

(65) Prior Publication Data

US 2007/0277543 A1      Dec. 6, 2007

(30) Foreign Application Priority Data

May 18, 2004    (DE) ................. 10 2004 024 664

(51) Int. Cl.
*F25B 41/04*    (2006.01)
*F25D 21/06*    (2006.01)
*F25B 41/00*    (2006.01)

(52) U.S. Cl. .................. 62/222; 62/151; 62/210
(58) Field of Classification Search .......... 62/222, 62/210, 151, 205, 213, 204
See application file for complete search history.

(56) References Cited

U.S. PATENT DOCUMENTS

| 4,686,835 | A | * | 8/1987 | Alsenz | 62/223 |
| 5,319,940 | A | * | 6/1994 | Yakaski | 62/617 |
| 6,505,476 | B1 | | 1/2003 | Nishida et al. | |

FOREIGN PATENT DOCUMENTS

| EP | 1 348 920 A2 | 10/2003 |
| EP | 1 348 920 A3 | 10/2003 |
| EP | 1 367 344 A2 | 12/2003 |
| EP | 1 367 344 A3 | 12/2003 |
| GB | 2 348 947 A | 10/2000 |
| WO | 2005/116541 A1 | 12/2005 |

* cited by examiner

*Primary Examiner*—Chen-Wen Jiang
(74) *Attorney, Agent, or Firm*—Lewis and Roca LLP

(57) ABSTRACT

The invention relates to a control unit for controlling the expansion valve of a refrigeration or air conditioning system, comprising a temperature sensor that is connected upstream of the expansion valve in the coolant circuit. If the control unit detects a decrease in temperature of the aforementioned temperature sensor, which is generally caused by the start of a defrosting process, it displaces the expansion valve into a static state, to protect said valve during the defrosting process.

9 Claims, 1 Drawing Sheet

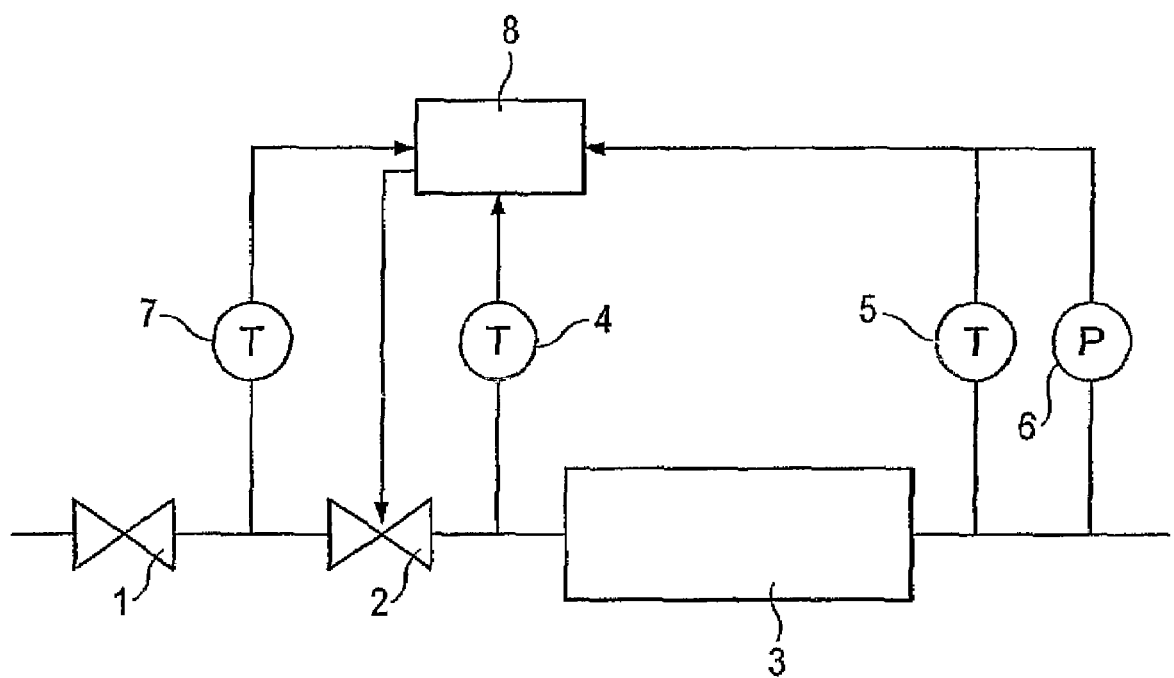

CONTROL DEVICE FOR REFRIGERATION OR AIR CONDITIONING SYSTEMS

CROSS-REFERENCE TO RELATED APPLICATIONS

This application claims priority to PCT Patent Application Ser. No. PCT/EP2005/004239, filed Apr. 20, 2005, which claims priority to German Patent Application Serial Number 10 2004 024 664.5, filed May 18, 2004, which are hereby incorporated by reference as if set forth herein.

FIELD

The invention relates to a control device for the control of at least one component of a refrigeration or air conditioning system comprising an evaporator, sensors disposed upstream and/or downstream of the evaporator in the coolant circuit and an electronic expansion valve, with the control device being designed to act on the expansion valve in dependence on signals delivered by the sensors.

BACKGROUND

The statements in this section merely provide background information related to the present disclosure and may not constitute prior art.

Refrigeration and air conditioning systems of the aforesaid type, whose coolant circuit also has a compressor and a liquefier in addition to the expansion valve and the evaporator, are known in the most varied embodiments from the prior art and are used, for example, for the cooling of food or for the air conditioning of rooms. It is necessary for a continuous, efficient and problem-free operation of refrigeration and air conditioning systems of this type to regularly defrost the evaporators which are used in each case and which ice during operation. It is an aim in this process to carry out the defrosting procedure as fast as possible in order not to expose food cooled in a refrigeration system, for example, to increased temperatures for an unnecessarily long time.

During the defrosting procedure, the coolant flow present in the coolant circuit has to be diverted or interrupted by means of hot gas or cold gas during the defrosting in order thus to make it possible for the hot gas or cold gas used for the defrosting to be able to be guided through the evaporator and optionally through the expansion valve. When defrosting via the ambient air or via an electrical defrost heating, the coolant flow does not necessarily have to be diverted, but must at least be interrupted so that the evaporator is not cooled by the coolant during the defrosting procedure, which would counteract the defrosting procedure.

The interruption or diversion of the coolant flow during the defrosting procedure is usually effected by solenoid valves which are located at a suitable position in the coolant circuit, with the position of the named solenoid valves being able to be disposed either close to the evaporator or also relatively far away from the evaporator in many applications.

It must furthermore be ensured during the defrosting procedure, if electronic expansion valves are used, that the latter are moved into a static state. If, namely, the regulating or control procedure present during normal operation were continued during defrosting, this could result in damage to the expansion valve since the latter is not designed for a dry run present during the defrosting procedure. Furthermore, a control or regulation of the expansion valve continued during the defrosting procedure would result in irritating noise pollution.

It is necessary in this respect that the control device associated with the electronic expansion valve is in each case informed of when a defrosting procedure starts and ends since it can otherwise not move the expansion valve into a static state. If the solenoid valves for the interruption or diversion of the coolant flow during the defrosting procedure are located close to the control and regulation device associated with the expansion valve, an electrical connection can be established between this device and the solenoid valves via which the named information is transmitted. In many applications, however, as already mentioned, the solenoid valves are arranged spatially far away from the control and regulation device associated with the expansion valve so that the establishment of an electrical connection is difficult or associated with a disproportionate effort. An application of this type is present, for example, in a supermarket with a plurality of freezers, where at least one electronic expansion valve is located with its respectively associated control device inside each freezer and the solenoid valves for the interruption or diversion of the coolant flow are accommodated centrally in a control room which is located comparatively far away from the freezers.

SUMMARY

An object of the invention accordingly consists of further developing a control device of the initially named kind such that no electronic connection is required between the solenoid valves for the interruption or diversion of the coolant circuit and the control device associated with the respective expansion valve for the management of the defrosting procedure.

This object is satisfied in that a temperature sensor is connected upstream of the expansion valve on its side remote from the evaporator in the coolant circuit, with the control device being designed for the interruption of its control function and for the arresting of the expansion valve in a static state when the temperature sensor delivers a temperature value lying below a predetermined threshold value or a temperature curve falling at least in a predetermined manner.

The invention thus makes use of the recognition that the coolant present in the piping in front of the expansion valve evaporates and thus develops a cooling effect on an interruption or diversion of the coolant flow. In normal operation of the coolant circuit outside the defrosting procedure, no evaporation procedure occurs in the piping in front of the expansion valve since the coolant evaporates exclusively in the evaporator and is only present in the piping in front of the expansion valve in liquid form. In this respect, the piping in front of the expansion valve has a higher temperature before and after the defrosting procedure than at the start of the defrosting procedure. This temperature difference which distinguishes the defrosting procedure from the normal operation is detected by the temperature sensor provided in accordance with the invention and reported to the control device for the controlling of the expansion valve so that the control device associated with the expansion valve is in a position to recognize when a defrosting procedure starts.

This recognition process can take place without any information having to be transmitted to the control device of the expansion valve from the solenoid valves ultimately triggering the defrosting procedure. If therefore the named solenoid valves are located, for example, in a control room remote from the freezers, the temperature sensors provided in accordance with the invention in the freezers could detect the temperature drop at the mentioned position of the piping of the coolant circuit and report it to the control device of the expansion valves likewise located in the respective freezer so that the control devices can then ultimately take care of moving the expansion valves into a static state.

The control devices made in accordance with the invention for the control of the expansion valves can move the expansion valves into a static condition, for example, when the temperature sensor provided in accordance with the invention delivers a temperature value lying below a predetermined threshold value. Alternatively, the named procedure can also be triggered when the temperature sensor in accordance with the invention delivers a temperature curve falling at least in a predetermined manner so that in this case it is not only the falling below of a threshold value which is used as the criterion for the start of the defrosting procedure, but rather the time development of the falling of the temperature in the region of the piping in front of the expansion valve.

It is preferred for the temperature sensor in accordance with the invention to be disposed directly in front of the expansion valve on its side remote from the evaporator in the coolant circuit so that the spatial distance between the temperature sensor and the expansion valve is as small as possible. It is achieved in this manner that the electrical lines between the temperature sensor and the control device associated with the expansion valve can be laid as much as possible along the same path as the electrical lines between the expansion valve and the control device. An additional effort for the laying of lines is practically almost completely dispensed with in this manner.

The expansion valve can generally be moved in any desired static state during the defrosting procedure. It can consequently be a completely open state, a completely closed state or an only partly open or closed state. It is, however, preferred for the expansion valve to be moved during the defrosting procedure into a state in which it is completely open since in this case a medium such as hot gas or cold gas, which may be used for the defrosting of the evaporator, can flow through the expansion valve without impediment.

To control the expansion valve during normal operation, that is before or after the defrosting procedure, a second temperature sensor can be provided between the expansion valve and the evaporator for the detection of the operating conditions of the evaporator and a third temperature sensor can be provided behind the evaporator, with the values delivered via the named temperature sensors being reported to the control device for the expansion valve. Alternatively or additionally to the third sensor behind the evaporator, a pressure sensor can also be used.

In accordance with the invention, the control device can also be designed such that it is not only suitable for the recognition of the start of a defrosting procedure, but also for the recognition of the ending of such a defrosting procedure. On the recognition of the ending of a defrosting procedure, the control device can then cancel the arrested state of the expansion valve and subsequently take over the normal control and regulation function of the expansion valve which is required for the cooling or air conditioning. On the ending of a defrosting procedure, the solenoid valves for the interruption or diversion of the coolant flow are controlled such that the coolant flow can again flow through the coolant circuit without hindrance. The coolant then accordingly also again flows through the evaporator which has the result that a temperature development is adopted which falls at least in a predetermined manner at the temperature sensor arranged between the expansion valve and the evaporator and/or at the temperature sensor disposed after the evaporator in the coolant circuit. This temperature development or the falling below of a threshold value can be detected by the control device, whereupon the arrested state of the expansion valve is cancelled and the normal control function of the expansion valve is taken up again. Alternatively or additionally to the named checking of the temperatures, the pressure increase can also be detected at a pressure sensor disposed after the evaporator in order to switch from the defrosting mode to the normal mode.

If the falling temperature development is alone or also considered for the named switch, a switch can, for example, always take place when a temperature drop of several degrees occurs within a few seconds. A temperature drop of this kind namely never occurs during a defrosting procedure as a rule, but only after its ending, so that it represents a significant criterion for the ending of the defrosting procedure. A drop of the temperature by 3 to 5° within 1 to 30 s is typical here.

The invention is not restricted to the control device explained above. It rather also relates to refrigeration or air conditioning systems in which at least one of the named control devices is used.

Further preferred embodiments of the invention are described in the dependent claims.

Further areas of applicability will become apparent from the description provided herein. It should be understood that the description and specific examples are intended for purposes of illustration only and are not intended to limit the scope of the present disclosure.

DRAWINGS

The invention will be described in the following with reference to an embodiment, FIG.1, a block diagram of a region of a coolant circuit.

DETAILED DESCRIPTION

The following description is merely exemplary in nature and is not intended to limit the present disclosure, application, or uses. It should be understood that throughout the drawings, corresponding reference numerals indicate like or corresponding parts and features.

A solenoid valve 1, an electronic expansion valve 2 and an evaporator 3 are arranged sequentially to one another in the coolant circuit in the direction of flow of the coolant. The solenoid valve 1 is located a plurality of meters in front of the expansion valve 2. Within the framework of the normal coolant circuit, which is present on a cooling or air conditioning effect of the evaporator 3, the coolant therefore first flows in liquid form through the solenoid valve 1 and subsequently through the electronic expansion valve 2, whereupon it is evaporated in the evaporator 3.

The electronic expansion valve 2 is located spatially close to the evaporator 3 so that both components 2, 3 can be arranged, for example, inside a freezer. The solenoid valve 1, in contrast, is spatially comparatively far away from the electronic expansion valve 2 so that it can be provided, for example, in a control room arranged separate from a freezer.

No electrical lines or technical data connections are located between the solenoid valve 1 and the electronic expansion valve 2, but only a pipe through which coolant flows.

A temperature sensor 4 is connected upstream of the evaporator in the direction of flow and a further temperature sensor 5 is connected downstream. A pressure sensor 6 is furthermore arranged behind the temperature sensor 5. All sensors 4, 5, 6 can, for example, like the evaporator 3 and the electronic expansion valve 2, be located within a freezer. The sensors 4, 5, 6 deliver temperature signals and pressure signals to a control device 8 in accordance with the invention which regulates the respective degree of opening of the electronic expansion valve 2 in the normal operation of the arrangement shown. The electronic expansion valve 2 is regulated in a usual manner such that an evaporation of the coolant supplied to the evaporator 3 takes place as completely as possible within the evaporator 3.

In accordance with the invention, a further temperature sensor 7, which can likewise be located inside a freezer, is disposed directly in front of the expansion valve 2 on its side remote from the evaporator 3. This temperature sensor 7 measures the temperature of the coolant line or of the coolant directly in front of the electronic expansion valve and is thus in a position, in the desired manner, to report a cooling of the piping directly in front of the electronic expansion valve 2 to the control device 8.

When the solenoid valve 1 is closed in the operation of the apparatus shown in the FIGURE to initiate a defrosting procedure in this manner, this results in an evaporation of coolant in the region of the temperature sensor 7 disposed in front of the electronic expansion valve 2. After the control device 8 has detected this cooling, it moves the electronic expansion valve 2 in a static, completely open state so that the electronic expansion valve 2 is protected during the defrosting procedure and optionally permits the flowing through of the evaporator 3 with a defroster medium.

When the solenoid valve 1 is opened again after the defrosting procedure, a temperature drop results at the temperature sensors 4, 5 and a pressure increase results at the pressure sensor 6. These temperature and/or pressure changes can now again be detected by the control device 8, which ultimately has the effect that the control device 8 again takes up the normal standard operation with respect to the electronic expansion valve 2.

The description is merely exemplary in nature and, thus, variations that do not depart from the gist of the present disclosure are intended to be within the scope of the invention. Such variations are not to be regarded as a departure from the spirit and scope of the present disclosure.

REFERENCE NUMERAL LIST

1 solenoid valve
2 electronic expansion valve
3 evaporator
4 temperature sensor
5 temperature sensor
6 pressure sensor
7 temperature sensor
8 control device

What is claimed is:

1. A control device for the control of at least one component of a system comprising an evaporator, sensors disposed at least one of upstream and/or downstream of the evaporator in the a coolant circuit and an electronic expansion valve, with the control device being designed to act on the expansion valve in dependence on signals delivered by the sensors, wherein
    a temperature sensor is disposed in front of the expansion valve on its side remote from the evaporator, with the control device being designed for the interruption of its control function and for the arresting of the expansion valve in a static state when the temperature sensor delivers one of a temperature value lying below a predetermined threshold value and a temperature development falling at least in a predetermined manner.

2. A control device in accordance with claim 1, wherein the temperature sensor is disposed directly in front of the expansion valve on its side remote from the evaporator in the coolant circuit.

3. A control device in accordance with claim 1, wherein the static state of the expansion valve corresponds to its open state.

4. A control device in accordance with claim 1, wherein a second temperature sensor is provided between at least one of the expansion valve and the evaporator, and in the coolant circuit behind the evaporator.

5. A control device in accordance with claim 1, wherein a pressure sensor is provided in the coolant circuit behind the evaporator.

6. A control device in accordance with claim 1, wherein the control device is designed for canceling an arrested state of the expansion valve and for again executing its control function related to the expansion valve when at least one of the temperature sensor located between the expansion valve and the evaporator and/or the temperature sensor disposed downstream of the evaporator in the coolant circuit deliver a temperature development falling at least in a predetermined manner.

7. A control device in accordance with claim 1, wherein a solenoid valve for interrupting and diverting the coolant circuit is arranged in the coolant circuit in front of the expansion valve and is in particular located a plurality of meters in front of the expansion valve.

8. A refrigeration or air conditioning system comprising an apparatus in accordance with claim 1.

9. A refrigeration or air conditioning system in accordance with claim 8, wherein it is designed for the defrosting of the evaporator by means of at least one of hot gas, cold gas, ambient air or by means of at least one of hot gas, cold gas, ambient air, and electric defrost heating.

* * * * *